(12) United States Patent
Zhao et al.

(10) Patent No.: US 9,138,091 B2
(45) Date of Patent: Sep. 22, 2015

(54) APPARATUSES AND METHODS FOR MANAGING LIQUID VOLUME IN A CONTAINER

(75) Inventors: Ying Zhao, Shanghai (CN); Jun She, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 549 days.

(21) Appl. No.: 13/380,913

(22) PCT Filed: Jul. 6, 2010

(86) PCT No.: PCT/IB2010/053083
§ 371 (c)(1),
(2), (4) Date: Dec. 27, 2011

(87) PCT Pub. No.: WO2011/004319
PCT Pub. Date: Jan. 13, 2011

(65) Prior Publication Data
US 2012/0097567 A1 Apr. 26, 2012

(30) Foreign Application Priority Data
Jul. 8, 2009 (CN) .......................... 2009 1 0158477

(51) Int. Cl.
| | | |
|---|---|---|
| G01F 23/292 | (2006.01) |
| G01F 23/20 | (2006.01) |
| A47G 23/16 | (2006.01) |
| G01F 23/00 | (2006.01) |
| G01F 23/18 | (2006.01) |

(52) U.S. Cl.
CPC ............ *A47G 23/16* (2013.01); *G01F 23/0076* (2013.01); *G01F 23/18* (2013.01); *G01F 23/2927* (2013.01)

(58) Field of Classification Search
CPC . G01F 23/265; G01F 23/292; G01F 23/2967; G01F 23/2921; G01F 23/247; G01F 23/261; A47G 19/2227
USPC ................ 73/290 B, 290 R, 290 V, 291–334; 220/62.12, 602, 703
See application file for complete search history.

(56) References Cited

U.S. PATENT DOCUMENTS

| | | | | |
|---|---|---|---|---|
| 3,741,656 A | * | 6/1973 | Shapiro ......................... 356/342 |
| 4,450,722 A | * | 5/1984 | Keyes et al. .................... 73/293 |
| 5,073,720 A | * | 12/1991 | Brown ........................... 250/577 |
| 5,159,834 A | * | 11/1992 | Eisele ............................. 73/293 |
| 5,492,246 A | * | 2/1996 | Bailey ........................... 220/756 |
| 5,565,977 A | * | 10/1996 | Rosinko .......................... 356/39 |
| 5,644,298 A | | 7/1997 | Brooks et al. |
| 5,747,824 A | * | 5/1998 | Jung et al. ..................... 250/577 |
| 5,803,283 A | * | 9/1998 | Barker et al. .................. 215/230 |
| D404,969 S | * | 2/1999 | Krenzler ....................... D7/507 |

(Continued)

FOREIGN PATENT DOCUMENTS

| | | | |
|---|---|---|---|
| DE | 102004004328 A1 | 8/2005 | |
| EP | 61797 A2 * | 10/1982 | ............. G01F 23/28 |

(Continued)

*Primary Examiner* — David A Rogers

(57) ABSTRACT

An apparatus and method for managing a liquid volume in a container includes a detector for detecting liquid volume changes in the container during a first preset period, a first determiner for determining whether the changes are lower than the first preset threshold value, and a presenter for presenting the first prompt information in case the changes are lower than the preset threshold value.

21 Claims, 6 Drawing Sheets

(56) References Cited

U.S. PATENT DOCUMENTS

| | | | |
|---|---|---|---|
| 5,896,990 A * | 4/1999 | Barzana | 206/459.1 |
| 5,950,487 A * | 9/1999 | Maresca et al. | 73/293 |
| 6,012,794 A * | 1/2000 | Nakano et al. | 347/7 |
| 6,118,134 A * | 9/2000 | Justak | 250/577 |
| 6,252,494 B1 * | 6/2001 | Howell | 340/309.8 |
| 6,274,880 B1 * | 8/2001 | Walker | 250/577 |
| 6,588,593 B2 | 7/2003 | Woskoski | |
| 6,921,911 B2 * | 7/2005 | Siepmann | 250/577 |
| 7,004,105 B2 * | 2/2006 | Bucksch | 116/227 |
| 7,107,838 B2 * | 9/2006 | Chai et al. | 73/304 R |
| 7,399,985 B2 * | 7/2008 | Mruk et al. | 250/577 |
| 7,581,442 B1 * | 9/2009 | Dietz et al. | 73/293 |
| 7,581,640 B2 * | 9/2009 | Lopez | 206/459.1 |
| 7,851,775 B2 * | 12/2010 | Hoyt et al. | 250/577 |
| 7,872,746 B2 * | 1/2011 | Gao et al. | 356/246 |
| 7,905,099 B2 * | 3/2011 | Justak | 62/127 |
| 8,338,811 B2 * | 12/2012 | Lang et al. | 250/577 |
| 8,446,283 B2 * | 5/2013 | Pietrorazio | 340/612 |
| 2002/0129663 A1 * | 9/2002 | Hoyt et al. | 73/861.79 |
| 2006/0207907 A1 | 9/2006 | Meehan | |
| 2007/0062277 A1 * | 3/2007 | Miller | 73/428 |
| 2010/0163567 A1 * | 7/2010 | Chiang et al. | 220/703 |
| 2011/0016969 A1 * | 1/2011 | Shamir et al. | 73/290 R |
| 2012/0094261 A1 * | 4/2012 | Hayn et al. | 434/247 |
| 2013/0275075 A1 * | 10/2013 | Johnson | 702/127 |

FOREIGN PATENT DOCUMENTS

| | | | | |
|---|---|---|---|---|
| EP | 0795740 A1 | 3/1997 | | |
| EP | 1382945 A1 | 1/2004 | | |
| GB | 2036326 A | * | 6/1980 | G01F 23/22 |
| JP | 58160822 A | 9/1983 | | |
| JP | 7177832 A | 7/1995 | | |
| TW | 200712453 | 4/2007 | | |
| WO | 0057059 | 9/2000 | | |
| WO | 2007108832 A2 | 9/2007 | | |

\* cited by examiner

APPARATUSES AND METHODS FOR MANAGING LIQUID VOLUME IN A CONTAINER

TECHNICAL FIELD

The present invention relates to apparatuses and methods for managing the liquid volume in a container.

BACKGROUND OF THE INVENTION

People need to drink sufficient water a day to stay in good health. However many people do not drink sufficient water and give the following reasons for that: they do not have enough time, they do not feel thirsty, they forget to drink, etc. It is reported that many people live with a level of mild dehydration. Some people do not drink until they feel thirsty. But the fact is that waiting to drink until parched is a mistake that means that the water level in the blood is so low that water is drawn from the salivary glands, which cues thirst and already has a negative impact on their health. Many chronic symptoms are actually signs of dehydration. Moreover, the senior adult is not able to rely on feeling thirsty, as the sense of thirst declines with age.

SUMMARY OF THE INVENTION

In view of the problem described in the paragraph above, according to one embodiment of the present invention, there is provided a solution for managing the liquid volume in a container, i.e. detecting liquid volume changes during a preset period of time and prompting the users with corresponding information.

According to one embodiment of the present invention, there is provided an apparatus for managing liquid volume in a container. The apparatus comprises a detector, a first determiner and a presenter. The detector is configured to detect liquid volume changes in said container during a first preset period of time. The first determiner is configured to determine whether said changes are lower than a first preset threshold value. The presenter is configured to present first prompt information in the case of said changes being lower than said first preset threshold value.

According to another embodiment of the present invention, there is provided a method of managing the liquid volume in a container, comprising the steps of: detecting liquid volume changes in said container during a first preset period of time; determining whether said changes are lower than a preset value; presenting first prompt information if said changes are lower than the preset value.

With the apparatuses and methods provided in the present invention, a person is prompted to drink drinkable liquids, such as water, in time and is able to control his drinking intake, which is beneficial to his health.

BRIEF DESCRIPTION OF THE DRAWINGS

The above and other objects, characteristics and merits of the present invention will become more apparent from the following detailed description considered in connection with the accompanying drawings, in which.

Figure 1:
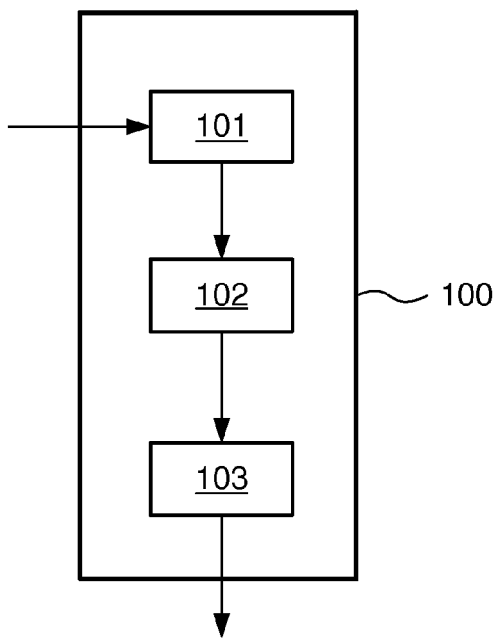
FIG. 1 illustrates an apparatus 100 for managing liquid volume in a container according to one embodiment of the present invention.

wherein the same or analogous reference numerals are used to represent the same or analogous step features/devices (modules) throughout the figures.

DETAILED DESCRIPTION OF THE EMBODIMENTS

Hereinafter, embodiments of the present invention are described in detail with reference to the accompanying drawings.

FIG. 1 illustrates an apparatus 100 for managing the liquid volume in a container according to one embodiment of the present invention. As shown in FIG. 1, the apparatus 100 comprises a detector 101, a first determiner 102 and a presenter 103.

It is to be understood by those skilled in the art that the container can be of various shapes. For example, the container can be a cup and the apparatus 100 can be fastened on the bottom of the cup or incorporated in a cushion where the cup is put on. It should be noted that the detector 101 should be arranged at a specific position of the container while the first determiner 102 and the presenter 103 can be arranged anywhere in the container.

Hereinafter, the operating process of the apparatus 100 is described in detail.

First, the detector 101 detects liquid volume changes in the container 11 during a first preset period of time. Then the first determiner 102 determines if the volume changes are lower than a first preset threshold value. If the liquid volume changes are lower than the first preset threshold value, the presenter 103 presents the first prompt information.

The first prompt information can be transferred in various ways. For example, the first prompt information can be "Liquid volume changes are lower than the first preset threshold value" or similar information. When the container is a cup of water, the first prompt information can prompt the owner of the cup to drink the water.

The presenter 103 can also present the first prompt information in various ways, for example, by producing beeps using a buzzer, or by producing a sound for the prompt "Liquid volume changes are smaller than the first preset threshold value" or by playing a tune through the loudspeaker, or by displaying the prompt "Liquid volume changes are smaller than the first preset threshold value" on a screen.

Specifically, the detector 101 can detect liquid volume changes in the container during the first preset period of time by various means. Hereinafter, various means of detecting the liquid volume changes are described in detail.

Figure 2:
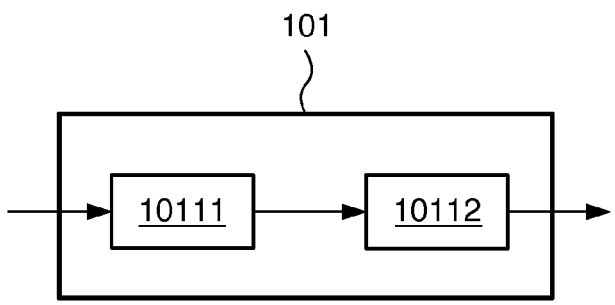
FIG. 2 illustrates a block diagram of the detector 101 in FIG. 1 according to one embodiment of the present invention.

In one embodiment of the present invention, the detector 101 comprises a weight sensor 10111 and a second determiner 10112, as shown in FIG. 2. The weight sensor 10111 measures the weight of a liquid in a container. According to the weight measured by the weight sensor 10111, the second determiner 10112 determines the liquid volume changes during a first preset period of time, for example, half an hour. If the weight sensor detects 300 g of liquid in the container at the first time and 200 g of liquid at the second time half an hour later, then the second determiner 10112 determines the liquid volume changes during half an hour to be 100 g.

Figure 3:
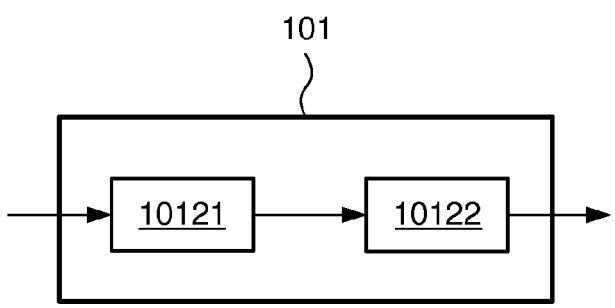
FIG. 3 illustrates a block diagram of the detector 101 in FIG. 1 according to another embodiment of the present invention.

In another embodiment, the detector 101 comprises a pressure sensor 10121 and a third determiner 10122, as shown in FIG. 3. The pressure sensor 10121 measures the pressure produced by the liquid in the container. According to the pressure measured by the pressure sensor 10121, the determiner 10122 determines the changes in liquid volume during a first preset period of time, for example, half an hour. If the pressure sensor 10121 detects $P_1$ of pressure produced by the liquid in the container at the first time and $P_2$ of pressure at the second time half an hour later, then the third determiner 10122 determines the liquid volume changes during half an hour to be $(P_1-P_2) \times S/g$, wherein S is the bottom area of the cup (given that the container has same cross-sectional area at any height), g is the acceleration of gravity. It should be noted that even if the cup has an irregular shape, for a given cup and a given liquid level, the corresponding liquid volume is determined. Accordingly, the third determiner 10122 can still determine the liquid volume changes according to the liquid level corresponding to the liquid pressure measured by the pressure sensor 10121.

Figure 4:
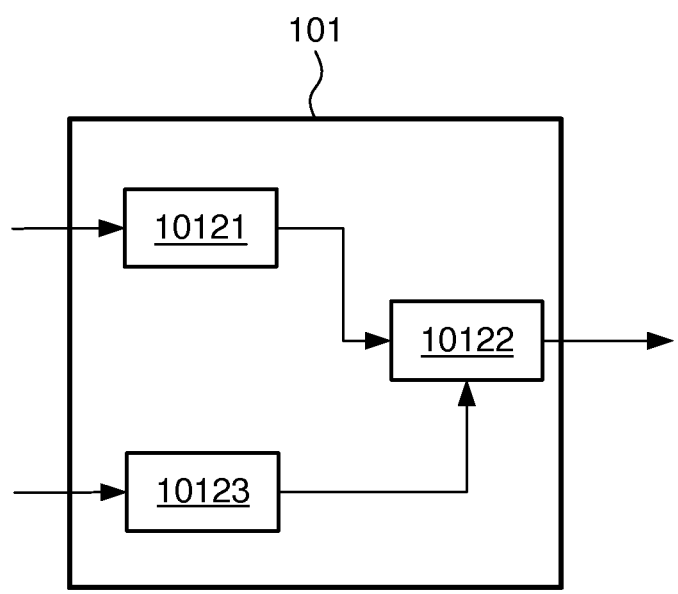
FIG. 4 illustrates a block diagram of the detector 101 in FIG. 1 according to another embodiment of the present invention.

In general, the pressure produced by the liquid is related to the liquid level. In the case that a container is inclined, there is a need to regulate the pressure value measured by the pressure sensor 10121 according to the inclination of the container so that liquid volume changes can be detected accurately. In such case, the detector 101 further comprises an inclination sensor 10123 as shown in FIG. 4. The inclination sensor is adapted for detecting the inclination angle between the container and horizontal plane or vertical direction. Then the pressure value is regulated according to the inclination angle measured.

Figure 5:
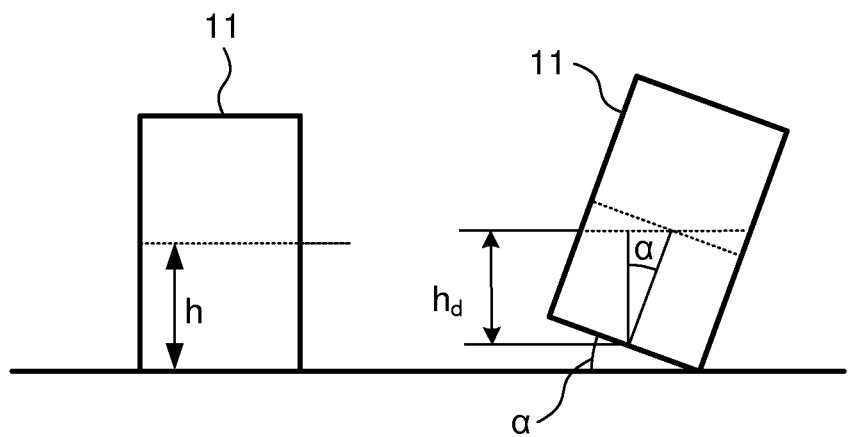
FIG. 5 illustrates a pressure sensor measuring the liquid pressure when the container is inclined.

Without loss of generality, take it for example that the container is a cylindrical cup 11 with a pressure sensor 10121 fastened on its center bottom, as shown in FIG. 5. Given that the cup is inclined with an inclination angle $\alpha$ relative to the horizontal plane, the pressure measured by the pressure sensor 10121 is produced by the liquid height $h_d = (h \times \cos \alpha)$ if the liquid level is h when the container is not inclined. So the actual liquid level is $h = h_d/\cos \alpha$ if the container is not inclined. Thus, by the measured inclination angle and the pressure produced by the liquid when the cup is inclined, the third determiner 10122 can determine the corresponding liquid level in the cup 11 if the cup 11 is not inclined. Thereby the liquid volume changes during a first preset period of time can be determined.

It should be noted that although the container in the shape of a cylindrical cup with the pressure sensor 10121 fastened on the center of its bottom is taken as an example of how to determine the liquid volume changes when the container is inclined in above paragraphs, it is to be understood by those skilled in the art that even if the container is irregularly shaped or the pressure sensor 10121 is fastened anywhere on the bottom of the container, for a certain-shaped container inclined at a certain angle with the pressure sensor 10121 fastened at a certain position, the third determiner 10122 can determine the liquid level or weight of the liquid according to the pressure measured by the pressure sensor 10121. Thus, liquid volume changes during a first preset period of time can be determined.

For near-IR lights such as spectral lines with a central wavelength of 940 nm generated by a LED, at least 40% energy will be absorbed when they pass through a light path of 5 cm within a medium of pure water. More energy will be absorbed if near-IR light passes through a light path of 5 cm within a medium of tea, juice or coffee. Thus, such characteristics of near-IR lights absorbed by liquids, especially drinkable liquids, can be utilized to measure the liquid level in a container, which is described in detail hereinafter.

Figure 6:
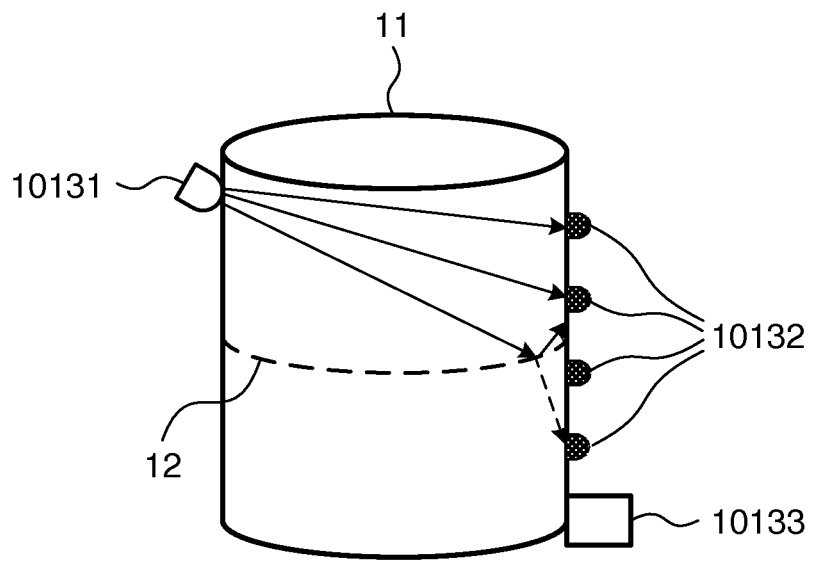
FIG. 6 illustrates a detector 101 comprising near-IR sensors according to one embodiment of the present invention.

According to one embodiment of the present invention, the detector 101 comprises a near-IR light source 10131, a plurality of near-IR sensors 10132 and a fourth determiner 10133 as shown in FIG. 6, wherein 12 denotes liquid level. The near-IR light source 10131 emits near-IR light, which can be detected by each of the plurality of sensors 10132 when there is no liquid in the container 11. The plurality of near-IR sensors 10132 are arranged at different height levels in the container 11 to detect intensities of near-IR light emitted by the near-IR light source 10131. The fourth determiner 10133 determines liquid level in the container 11 according to the intensities of near-IR light detected by the plurality of near-IR sensors 10132 and thereby determines the liquid volume changes during said first preset period of time.

If a near-IR sensor 10132 is arranged below the liquid level, the light intensity it detects is rather weak. But, if a near-IR sensor is arranged above the liquid level, then the light intensity it detects is relatively strong. Thus, the fourth determiner 10133 can determine the relative position of a near-IR sensor and the liquid level according to the light intensity detected by the near-IR sensor. In other words, the fourth determiner 10133 can determine that a near-IR sensor 10132 with light intensity it detected higher than a second preset threshold value is arranged above the liquid level and the near-IR sensor 10132 with light intensity it detected lower than a third preset threshold value is arranged below the liquid level.

If the light intensities detected by some of the plurality of near-IR sensors 10132 are higher than the second preset threshold value while the light intensities detected by others of the plurality of near-IR sensors 10132 are lower than the third preset threshold value, then the fourth determiner 10133 determines the height between the two neighboring near-IR sensors as the liquid level, wherein one of the two neighboring near-IR sensors detects light intensity higher than the second preset threshold value and the other of the two neighboring near-IR sensors detects light intensity lower than the third preset threshold value. Alternatively, the fourth determiner 10133 can determine the arbitrary height between the aforesaid two neighboring near-IR sensors as the liquid level. Alternatively, the fourth determiner 10133 can also determine the mid-height between the aforesaid two neighboring near-IR sensors as the liquid level.

If the light intensities detected by all of the plurality of near-IR sensors 10132 are higher than the second preset value, then the height of the lowermost near-IR sensor 10132 or arbitrary height below it can be determined as the liquid level.

If the light intensities detected by all of the plurality of the near-IR sensors 10132 are lower than the third preset value, then the height of the uppermost near-IR sensor 10132 or the arbitrary height above it can be determined as the liquid level.

Figure 7:
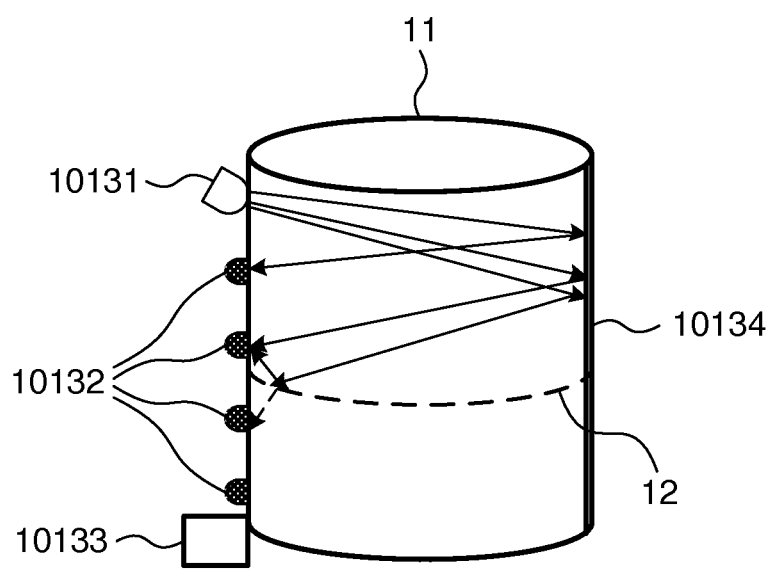
FIG. 7 illustrates a detector 101 comprising near-IR sensors according to another embodiment of the present invention.

It should be noted that in above cases the precision in detection is related with number of the near-IR sensors. The larger the number of the near-IR sensors is, the more precise the detection is. The plurality of near-IR sensors 10132 can be arranged on sidewall of the container 11 with equal or unequal height spacing. Usually, the plurality of near-IR sensors 10132 and the near-IR light source 10131 are arranged on the opposite sidewalls of the container 11 respectively, as shown in FIG. 6. According to one embodiment of the present invention, the plurality of near-IR sensors 10132 and the near-IR light source 10131 are arranged on the same sidewall of the container 11. And there is provided a reflector 10134 on the opposite sidewall for reflecting lights emitted by the near-IR light source 10131 so as to make the near-IR lights can be detected by the plurality of near-IR sensors 10132, as shown in FIG. 7. The advantage of the embodiment is that the optical path the near-IR light passes through is increased, i.e., the contrast among light intensities detected by respective near-IR sensors is increased which is advantageous for the fourth determiner 10133 to determine liquid level.

Figure 8:
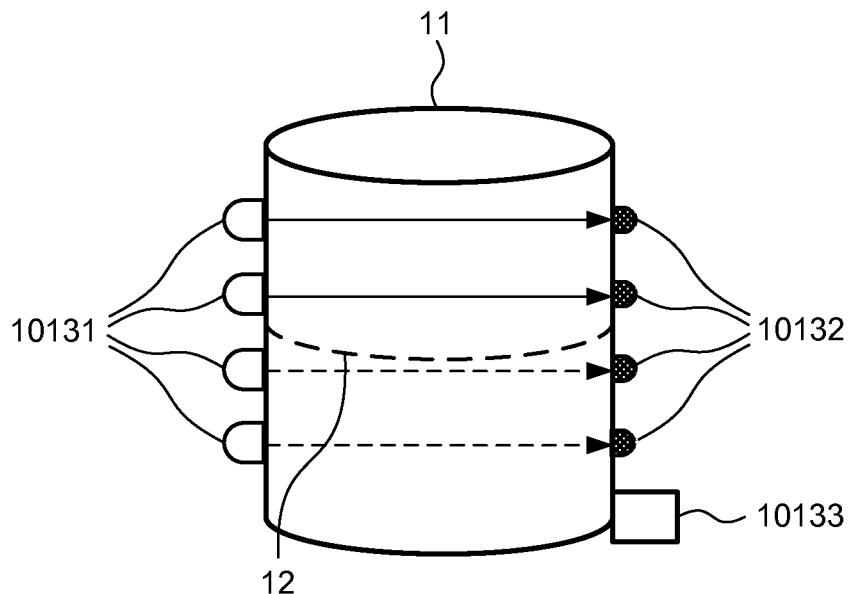
FIG. 8 illustrates a detector 101 comprising near-IR sensors according to another embodiment of the present invention.

As shown in FIG. 6, light intensity detected by a near-IR sensor far from the near-IR light source 10131 is weaker than the light intensity detected by a near-IR sensor near to the near-IR light source 10131. Besides, due to limited light-emitting angle of single light source, there are cases where some of the near-IR sensors 10132 cannot detect any lights generated by the near-IR light source. Therefore, to increase sensitivity of the near-IR sensors 10132, the near-IR light source 10131 in FIG. 6 can also adopt a plurality of separate light-emitting elements, such as a plurality of near-IR LED lights, each of which corresponds to one near-IR sensor 10132 and is arranged at the same height with the corresponding sensor, as shown in FIG. 8. When there is no liquid in the container 11, for each light-emitting element, most light it emits can be detected by the corresponding near-IR sensor 10132.

Figure 9:
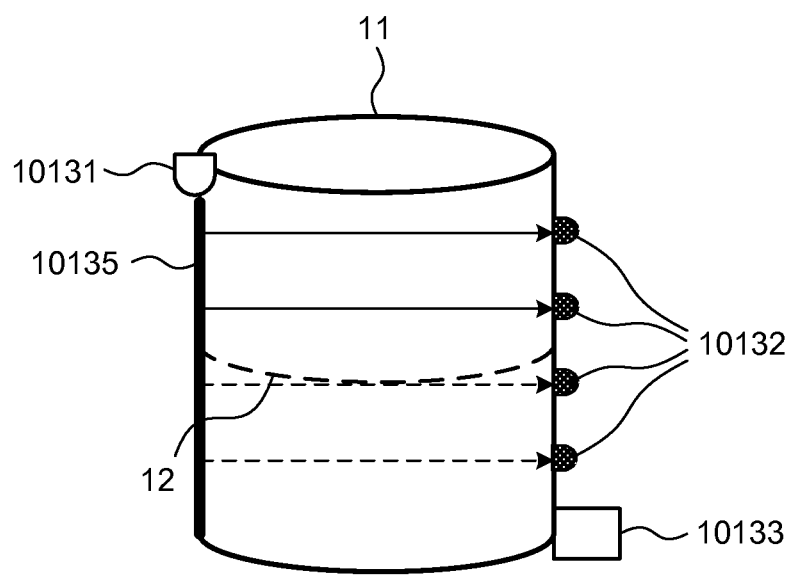
FIG. 9 illustrates a detector 101 comprising near-IR sensors according to another embodiment of the present invention.

Optionally, for the detector 101 shown in FIG. 8, the plurality of separate elements of the light source can be replaced by a single light source 10131 in combination with a light-guiding means 10135, as shown in FIG. 9. The light-guiding means 10135 extracts the near-IR light emitted by the near-IR light source 10131 so that the plurality of near-IR sensors 10132 can detect near-IR light emitted by the near-IR light source 10131. The light-guiding means 10135 can be a light-guiding plate or an optical fiber, which receives the near-IR light emitted by the near-IR light source 10131 and then extracts the light out from its surface to make the light enter into the plurality of near-IR sensors 10132. The optical path is schematically illustrated in FIG. 9.

Figure 10:
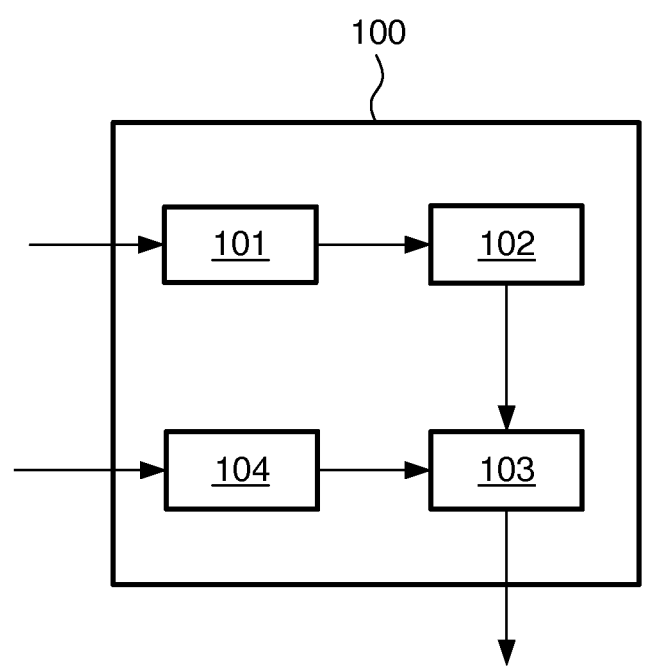
FIG. 10 illustrates an apparatus 100 for managing liquid volume in a container according to another embodiment of the present invention.

Optionally, the apparatus 100 in FIG. 1 can further comprise an accelerometer 104, as shown in FIG. 10. The accelerometer 104 detects acceleration of the container 11. If the accelerometer 104 doesn't detect any acceleration of the container 11 during a second preset period of time, then the presenter 103 presents second prompt information. The second prompt information can be information such as "No acceleration is detected during the second preset period" or similar. In the case of the container 11 being a drinking cup, the second prompt information can be information such as "You did not drink any water for a period of time" for prompting people of the fact that he/she has not drunk any water for a period of time. As described above, the presenter 103 can present the second prompt information by various means.

Usually, the detection results of liquid volume changes in a container, detected by the above described detector 101 utilizing the weight sensor 10111 or the near-IR sensors 10131, can be more precise if the container 11 is positioned horizontally, i.e. oriented vertically. To obtain more precise measurement results, it is optional that the accelerometer 104 can also be used to detect a first inclination angle between the container 11 and the horizontal plane or a second inclination angle between the container 11 and the vertical direction. Only if the first inclination angle is larger than a fourth preset threshold value or the second inclination angle is smaller than a fifth preset threshold value, then the detector 101 detects the liquid volume changes. In other words, only if the container 11 is positioned horizontally or quasi-horizontally, i.e. oriented vertically or quasi-vertically, with the first inclination angle being approximately 90 degrees and the second inclination angle being approximately 0 degrees, then the weight sensor 10111 or the near-IR sensors 10131 do the detection work. The fourth preset threshold value and the fifth preset threshold value are adjustable according to actual need for measurement precision.

Specifically, how the accelerometer 104 measures the inclination angle is a mature technology in the art. In an application document Rev 0.05 of chip AN3107 released by Freescale Semiconductor Corp. in 2005, a method for measuring the inclination angle using accelerometer is disclosed as is shown in the following formula:

$$\theta = \arcsin\left(\frac{V_{OUT} - V_{OFFSET}}{\frac{\Delta V}{\Delta g}}\right)$$

Wherein θ is the angle between the accelerometer and the horizontal plane, $V_{OUT}$ is the output voltage of the accelerometer, $V_{OFFSET}$ is the bias voltage when the acceleration of the accelerometer is 0 g, $\Delta V/\Delta g$ is the sensitivity, g is the acceleration of gravity. More detailed information can be found in the application document of chip AN3107, which is not repeated herein.

Figure 11:
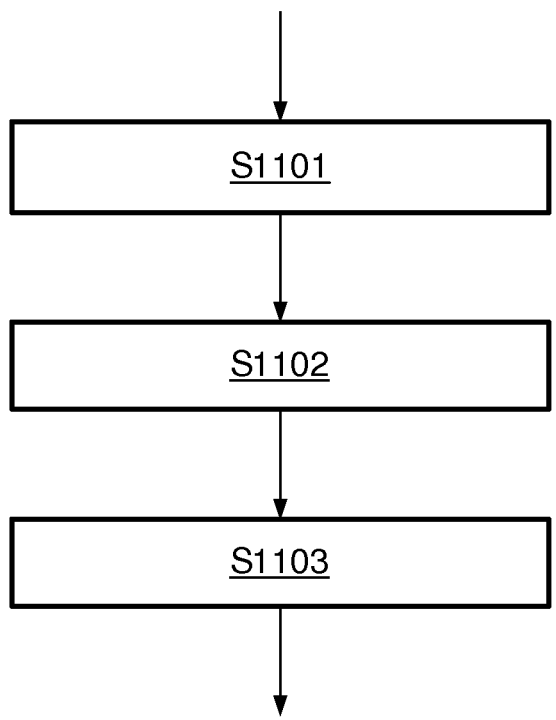
FIG. 11 illustrates a flow chart of a method for monitoring liquid volume in a container according to another embodiment of the present invention.

According to one embodiment of the present invention, FIG. 11 illustrates a flow chart of the method of managing liquid volume in a container.

First, in step S1101, liquid volume changes during a first preset period of time are detected. The liquid volume changes can be determined by detecting changes of liquid weight, changes of liquid level or changes of pressure produced by the liquid during the first preset period of time. According to one embodiment, the aforesaid detector 101 can perform step S1101.

Next, in step S1102, if the liquid volume changes are lower than a first preset threshold value is determined. According to one embodiment, the aforesaid first determiner 102 can perform step S1102.

Finally, in step S1103, the first prompt information is presented if the liquid volume changes are lower than the first preset threshold value. According to one embodiment, the aforesaid presenter 103 can perform step S1103.

Figure 12:
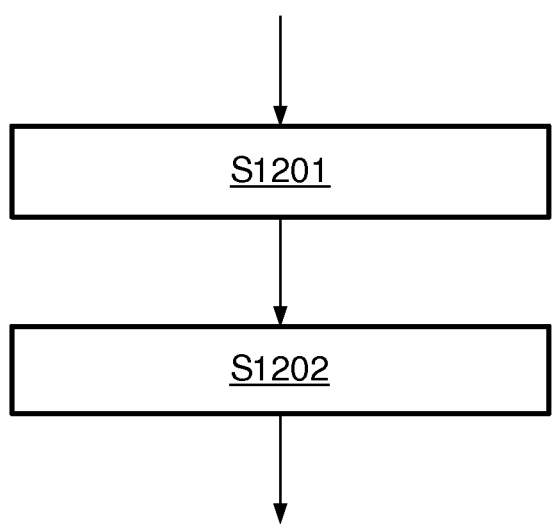
FIG. 12 illustrates a flow chart of a method for monitoring liquid volume in a container according to another embodiment of the present invention.

Optionally, the method shown in FIG. 11 can further comprise the steps shown in FIG. 12.

First, in step S1201, the acceleration of the container is detected.

If no acceleration of the container is detected during a second preset period of time, then, in step S1202, the second prompt information is presented.

Usually, for determining the liquid volume changes in a container in step S1101, precise detection results can be obtained by means of a pressure sensor and IR sensor only if the container is positioned horizontally. To obtain more precise results, it is optional to measure a first inclination angle between the container and the horizontal plane or a second inclination angle between the container and the vertical direction. And the liquid volume changes are detected only if the first inclination angle is larger than the fourth preset threshold value or the second inclination angle is smaller than the fifth preset threshold value. In other words, the liquid volume changes are detected only if the container is positioned horizontally or quasi-horizontally with the first inclination angle being approximately 90 degrees and the second inclination angle being approximately 0 degrees. The fourth preset threshold value and the fifth preset threshold value can be adjusted according to the actual need for detection precision.

Various embodiments of the present invention have been described in detail in the text above. It should be noted that the first to the fifth preset threshold values can be selected according to practical conditions and that users can set them. For example, the apparatus 100 can further comprise an interactive unit for receiving respective preset threshold values input by users. Likewise, the first and second preset period of time can also be set by the detector 101, or by users via the interactive unit.

Aforesaid embodiments can be carried out alone or some of them can be carried out in conjunction with each other. For example, under the circumstance that the detector 101 is structured as shown in any of FIG. 2 to FIG. 4 or FIG. 6 to FIG. 9, the apparatus 100 can further comprise an accelerometer 104. Under the circumstance that the detector 101 comprises a pressure sensor 10121, a third determiner 10122 and an inclination sensor 10123 as shown in FIG. 4, the function of the inclination sensor 10123 can also be performed by the accelerometer 104 in aforesaid manner. In other words, the accelerometer 104 and the inclination sensor 10123 can share the same hardware. Furthermore, the detector 101, when configured to the configuration shown in FIGS. 6 to 9, can further comprise a reflector 10134 and a light-guiding device 10135.

It should be noted that the embodiments described above are for the purpose of illustration only and are not to be construed as limitation of the invention. All such modifications which do not depart from the spirit of the invention, are intended to be included within the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units. Several of these units can be embodied by one and the same item of hardware or software. The usage of the words first, second and third, et cetera, does not indicate any ordering. These words are to be interpreted as names.

What is claimed is:

1. An apparatus for managing liquid volume of a liquid in a container, comprising:
   a detector configured to detect liquid volume changes in said container during a first preset period of time;
   a first determiner configured to determine whether said changes are lower than a first preset threshold value; and
   a presenter configured to present first prompt information in response to said changes being lower than said first preset threshold value,
   wherein said detector comprises:
      a single near-IR light source configured to emit near-IR light;
      a plurality of near-IR sensors configured to detect intensities of the near-IR light emitted by said single near-IR light source, wherein said single near-IR light source and said plurality of near-IR sensors are arranged at a first sidewall of said container; and
      a reflector arranged on a second sidewall of said container opposite to said first sidewall and configured to reflect the near-IR light emitted by said single near-IR light source towards said plurality of near-IR sensors, and
   wherein the plurality of near-IR sensors detect the near-IR light emitted from the single near-IR light source.

2. The apparatus according to claim 1, wherein said detector further comprises:
   a weight sensor configured to measure liquid weight in said container; and
   a second determiner configured to determine said liquid volume changes during said first preset period of time according to the weight measured by said weight sensor.

3. The apparatus according to claim 1, wherein said detector further comprises:
   a pressure sensor configured to measure pressure produced by said liquid in said container; and
   a third determiner configured to determine said liquid volume changes during said first preset period of time according to the pressure measured by said pressure sensor.

4. The apparatus according to claim 3, wherein said detector further comprises:
   an inclination sensor configured to measure inclination angle of said container; and wherein
   said third determiner is further configured to determine said liquid volume changes during said first preset period of time according to the inclination angle measured by said inclination sensor and the pressure measured by said pressure sensor.

5. The apparatus according to claim 1, wherein said plurality of near-IR sensors is respectively arranged at the first sidewall of the container at different heights; and
   wherein said first determiner is further configured to determine liquid level of said liquid and thereby determine said liquid volume changes during said first preset period of time based on the intensities of near-IR light detected by said plurality of near-IR sensors.

6. The apparatus according to claim 5, wherein said detector further comprises a light-guide configured to extract the near-IR light emitted by said single near-IR light source, so that said plurality of near-IR sensors detects the near-IR light emitted through the light-guide by said single near-IR light source.

7. The apparatus according to claim 1, further comprising:
   an accelerometer configured to measure acceleration of said container;
   wherein said presenter is further configured to present a second prompt information if no acceleration of said container is detected by said accelerometer during a second preset period of time.

8. The apparatus according to claim 7, wherein said accelerometer is further configured to measure a first inclination angle between said container and a horizontal plane or a second inclination angle between said container and a vertical direction; and said detector is further configured to detect said liquid volume changes if said first inclination angle is higher than a second preset threshold value or said second inclination angle is lower than a third preset threshold value.

9. The apparatus according to claim 1, wherein the presenter is configured to present the first prompt information by playing a tune through a loudspeaker.

10. A cup having an apparatus for managing liquid volume of a liquid in the cup, the apparatus comprising:
a detector configured to detect liquid volume changes in said container during a first preset period of time;
a determiner configured to determine whether said changes are lower than a first preset threshold value; and
a presenter configured to present first prompt information in response to said changes being lower than said first preset threshold value,
wherein said detector comprises:
a single near-IR light source configured to emit near-IR light;
a plurality of near-IR sensors configured to detect intensities of the near-IR light emitted by said single near-IR light source, wherein said single near-IR light source and said plurality of near-IR sensors are arranged at a first sidewall of said container; and
a reflector arranged on a second sidewall of said container opposite to said first sidewall and configured to reflect the near-IR light emitted by said single near-IR light source towards said plurality of near-IR sensors, and
wherein the plurality of near-IR sensors detect the near-IR light emitted from the single near-IR light source.

11. The cup of claim 10, wherein the determiner is further configured to determine liquid level of the liquid and thereby determine the liquid volume changes during the first preset period of time based on the intensities of near-IR light detected by the plurality of near-IR sensors.

12. A method of managing liquid volume of a liquid in a container, comprising acts of:
detecting liquid volume changes in said container during a first preset period of time;
determining whether said changes are lower than a first preset threshold value; and
presenting first prompt information if said changes are lower than the a first preset threshold value,
wherein the detecting act comprises acts of:
reflecting near-IR light emitted by a single near-IR light source and reflected by a reflector arranged on a sidewall of said container;
detecting by a plurality of near-IR sensors the near-IR light reflected by the reflector; and
determining said liquid volume changes by detecting changes in intensities of the near-IR light detected by said plurality of near-IR sensors,
wherein the plurality of near-IR sensors detect the near-IR light emitted from the single near-IR light source.

13. The method according to claim 12, wherein said detecting act comprising an act of:
determining said liquid volume changes by detecting changes of weight of said liquid, changes of pressure of said liquid or changes of liquid level of said liquid during said first preset period of time.

14. The method according to claim 12, further comprising following acts which are performed before said act of detecting liquid volume changes:
detecting acceleration of said container; and
presenting second prompt information if no acceleration of said container is detected during a second preset period of time.

15. The method according to claim 12, wherein the presenting act comprises an act of playing a tune through a loudspeaker.

16. An apparatus for managing liquid volume of a liquid in a container, comprising:
a detector configured to detect liquid volume changes in the container during a first preset period of time;
a determiner configured to determine whether the changes are lower than a first preset threshold value; and
a presenter configured to present first prompt information in response to the changes being lower than the first preset threshold value,
wherein the detector comprises:
a single near-IR light source configured to emit near-IR light and located at a first sidewall of the container;
a plurality of near-IR sensors configured to detect intensities of the near-IR light emitted by the single near-IR light source, wherein the plurality of near-IR sensors are arranged at a second sidewall of the container opposite the first sidewall; and
a light-guide coupled to the single near-IR light source and configured to extract the near-IR light emitted by the single near-IR light source for detection by the plurality of near-IR sensors,
wherein the plurality of near-IR sensors detect the near-IR light emitted from the single near-IR light source, and
wherein the light-guide is a light guiding plate located along the first sidewall of the container for emitting light towards the plurality of near-IR sensors.

17. The apparatus of claim 16, wherein the determiner is further configured to determine liquid level of the liquid and thereby determine the liquid volume changes during the first preset period of time based on the intensities of near-IR light detected by the plurality of near-IR sensors.

18. The apparatus of claim 16, wherein the plurality of near-IR sensors are respectively arranged at the second sidewall of the container at different heights, and wherein each respective near-IR sensor of the plurality of near-IR sensors is configured to detect light from the light-guide emitted at a same height as the height of the respective near-IR sensor.

19. The apparatus of claim 16, wherein the single near-IR light source and at least one sensor of the plurality of near-IR sensors are arranged at the first sidewall of the container, and wherein the detector further comprises a reflector arranged at the second sidewall of the container opposite to the first sidewall and configured to reflect the near-IR light emitted by the single near-IR light source towards the plurality of near-IR sensors.

20. The apparatus of claim 16, wherein the single near-IR light source comprises a plurality of separate light-emitting elements, and wherein each of the plurality of separate light-emitting elements respectively corresponds to each of the plurality of near-IR sensors and is arranged at a same height with its corresponding near-IR sensor.

21. The apparatus of claim 16, wherein the presenter is configured to present the first prompt information by playing a tune through a loudspeaker.

* * * * *